(12) United States Patent
Pramod et al.

(10) Patent No.: US 12,528,539 B2
(45) Date of Patent: Jan. 20, 2026

(54) SYSTEMS AND METHODS FOR COORDINATED CHASSIS CONTROL

(71) Applicant: Steering Solutions IP Holding Corporation, Saginaw, MI (US)

(72) Inventors: Prerit Pramod, Bellevue, WA (US); Joseph A. LaBarbera, Saginaw, MI (US); Chethan Narayanaswamy, Saginaw, MI (US); Scott T. Sanford, Swartz Creek, MI (US); Michael S. Wyciechowski, Grand Blanc, MI (US); Gregory J. Katch, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 46 days.

(21) Appl. No.: 18/743,258

(22) Filed: Jun. 14, 2024

(65) Prior Publication Data

US 2025/0382006 A1 Dec. 18, 2025

(51) Int. Cl.
*B62D 7/15* (2006.01)
*B62D 6/00* (2006.01)

(52) U.S. Cl.
CPC .............. *B62D 7/159* (2013.01); *B62D 6/008* (2013.01)

(58) Field of Classification Search
CPC .................................. B62D 7/159; B62D 6/008
See application file for complete search history.

(56) References Cited

U.S. PATENT DOCUMENTS

| 6,886,656 | B2 * | 5/2005 | Fujioka | B62D 6/008 |
| | | | | 180/402 |
| 12,371,093 | B2 * | 7/2025 | Major | B62D 5/008 |
| 2003/0230448 | A1 * | 12/2003 | Guldner | B62D 5/006 |
| | | | | 180/402 |
| 2019/0031231 | A1 * | 1/2019 | George | B62D 5/0463 |
| 2021/0291889 | A1 * | 9/2021 | Maeshiro | B62D 6/008 |

\* cited by examiner

*Primary Examiner* — George C Jin
(74) *Attorney, Agent, or Firm* — Dickinson Wright PLLC

(57) ABSTRACT

A method for coordinated chassis control under a split road friction condition includes receiving, in response to a detected split road friction condition, a first rack position command from a brake controller of a vehicle. The method also includes receiving a second rack position command from a handwheel actuator, estimating a driver torque value based on the second rack position command, determining a driver intent value based on the driver torque value, and generating a blended rack position command based on the first rack position command and the driver intent value. The method also includes selectively controlling rack position of a rack associated with a steering system of the vehicle based on the blended rack position command, the first rack position command, and the second rack position command.

20 Claims, 5 Drawing Sheets

SYSTEMS AND METHODS FOR COORDINATED CHASSIS CONTROL

TECHNICAL FIELD

This disclosure relates to vehicle steering, and in particular to systems and methods for coordinated chassis control.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for coordinated chassis control. The method includes receiving, in response to a detected condition, a first rack position command from a controller of a vehicle. The method also includes receiving a second rack position command from a handwheel actuator, estimating a driver torque value based on the second rack position command, determining a driver intent value based on the driver torque value, and generating a blended rack position command based on the first rack position command and the driver intent value. The method also includes selectively controlling rack position of a rack associated with a steering system of the vehicle based on the blended rack position command, the first rack position command, and the second rack position command.

Another aspect of the disclosed embodiments includes a system for coordinated chassis control. The system includes a processor, and a memory. The memory includes instructions that, when executed by the processor, cause the processor to: receive, in response to a detected condition, a first rack position command from a controller of a vehicle; receive a second rack position command from a handwheel actuator; estimate a driver torque value based on the second rack position command; determine a driver intent value based on the driver torque value; generate a blended rack position command based on the first rack position command and the driver intent value; and selectively control rack position of a rack associated with a steering system of the vehicle based on the blended rack position command, the first rack position command, and the second rack position command.

Another aspect of the disclosed embodiments includes an apparatus for coordinated chassis control under a split road friction condition. The apparatus includes a processor, and a memory. The memory includes instructions that, when executed by the processor, cause the processor to: receive, in response to a detected split road friction condition, a first rack position command from a brake controller of a vehicle; receive a second rack position command from a handwheel actuator; determine a driver torque value based on the second rack position command; determine a driver intent value by applying at least one high pass filter to the driver torque value and applying at least one low pass filter to the driver torque value; generate a blended rack position command based on the first rack position command and the driver intent value; and selectively control rack position of a rack associated with a steering system of the vehicle based on at last one of the blended rack position command, the first rack position command, and the second rack position command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
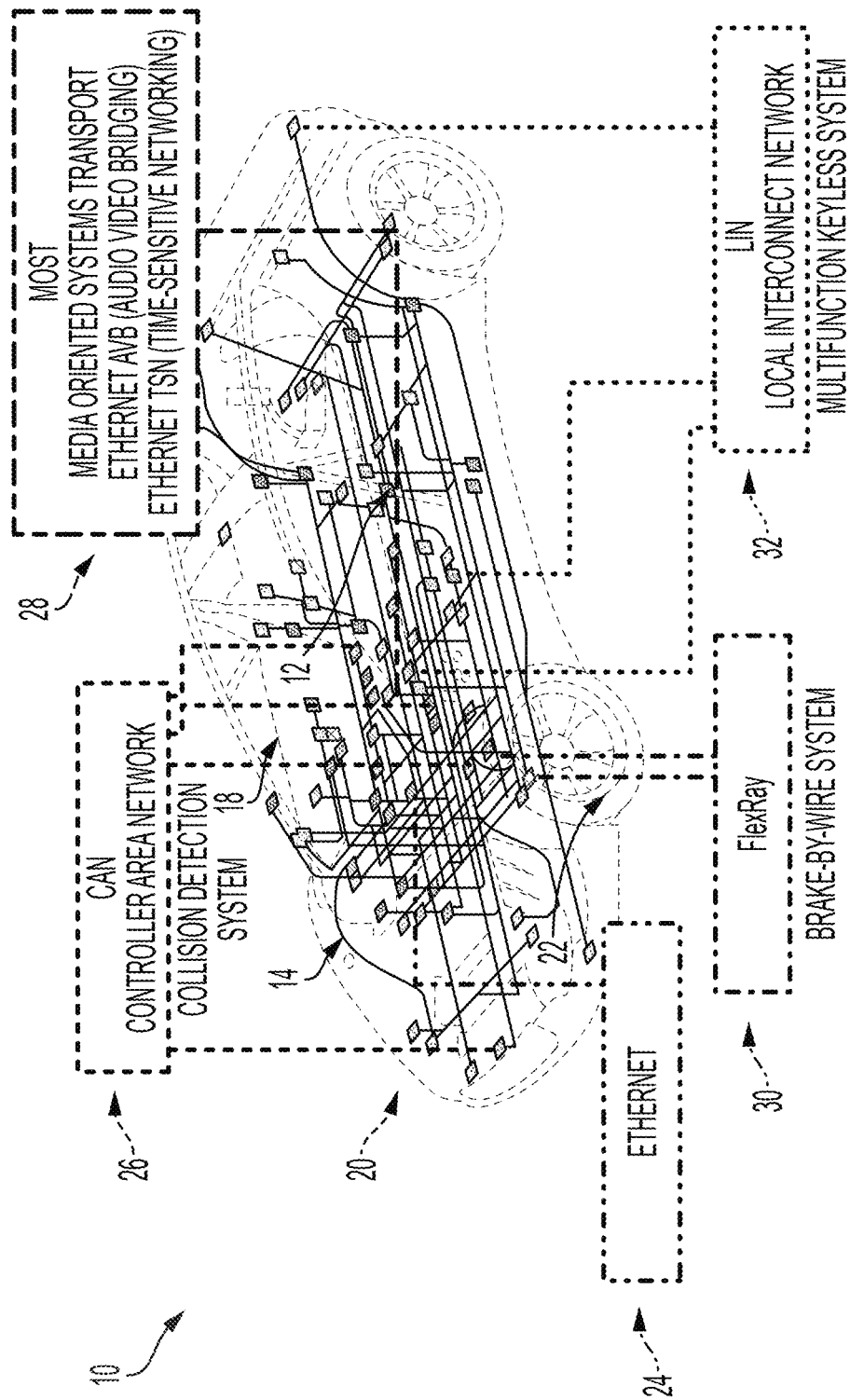
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an EPS steering system, a SbW steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

During operation of a vehicle, the steering system may experience a split road friction condition (e.g., which may be referring to herein as a split mu condition). Split mu refers to a vehicle operating condition where at least two tires are on respective surfaces with different friction characteristics. Under these conditions, unbalanced forces generated by the two tires, while the vehicle is moving, causes a yaw moment on the vehicle and can result is the unintentional turning of the vehicle (e.g., regardless of driver input).

Typically, a brake systems on each tire of the vehicle (e.g., and being decoupled), are able to detect such conditions and can determine corrective action. In the case of SbW steering systems, the brake system may issue a rack position command to a roadwheel actuator (RWA) to counteract the unintentional yaw induced from the split mu condition. However, in such scenarios, a handwheel actuator (HWA) of the steering system may be disconnected from the RWA, which may result in driver inputs being ignored.

Accordingly, systems and methods, such as those described herein, configured to coordinated chassis control under a split road friction condition, may be desirable. In some embodiments, the systems and methods described herein may be configured to utilize the rack position command from the brake controller to stabilize the vehicle under split mu conditions. Additionally, or alternatively, the systems and methods described herein may be configured to determine driver intent and manage the vehicle stabilization while honoring driver inputs.

In some embodiments, the systems and methods described herein may be configured to coordinate a steering system with brake controllers within a vehicle operating under split mu conditions to ensure vehicle yaw stabilization under split mu road conditions by utilizing the brake controller to operate the roadwheel actuator. The systems and methods described herein may be configured to incorporate driver intent to honor driver inputs through conditional blending and transition management.

In some embodiments, the systems and methods described herein may be configured to provide coordinated chassis control. The systems and methods described herein may be configured to receive, in response to a detected condition, a first rack position command from a controller of a vehicle. The condition may include a split mu condition, a condition associated with one or more objects in an environment of the vehicle (e.g., including, but not limited to, a condition associated with a detected object in a travel path of the vehicle, the object being detected by an image capturing device, an automatic driver assistants system (ADAS), a stability control system or device, and/or the like), and/or a condition associated with any data or signal generated by and/or associated with any vehicle system and/or associated controller and/or sensor. In some embodiments, the systems and methods described herein may be configured to detect the split road friction condition based on one or more signals received from the brake controller and/or using any suitable information or technique.

The systems and methods described herein may be configured to receive a second rack position command from a handwheel actuator. The systems and methods described herein may be configured to estimate a driver torque value based on the second rack position command. For example, the systems and methods described herein may be configured to estimate the driver torque value based on the second rack position command using a model-based approach, using a disturbance observer, using a corresponding handwheel actuator torque value, any other suitable information or technique, or a combination thereof.

The systems and methods described herein may be configured to determine a driver intent value based on the driver torque value. For example, the systems and methods described herein may be configured to determine the driver intent value by applying at least one high pass filter to the driver torque value, by applying at least one low pass filter to the driver torque value, using any suitable technique, and/or a combination thereof.

The systems and methods described herein may be configured to generate a blended rack position command based on the first rack position command and the driver intent value. The blended rack position command may be 0 or substantially 0, in response to the driver intent value being 0. The systems and methods described herein may be configured to selectively control rack position of a rack associated with a steering system of the vehicle based on the blended rack position command, the first rack position command, and the second rack position command.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
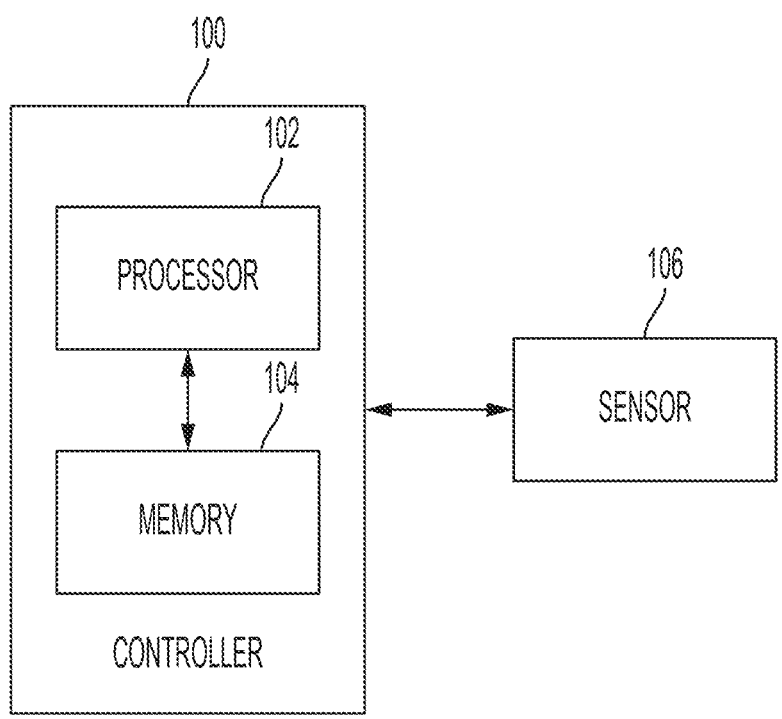
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, one or more external sensors or devices, one or more yaw rate sensors or devices, one or more lateral acceleration sensors or devices, one or more longitudinal acceleration sensors or devices, other suitable sensors or devices, or a combination thereof. The one or more signals may indicate a handwheel torque, a handwheel angle, a motor velocity, a vehicle speed, other suitable information, or a combination thereof.

Figure 3:
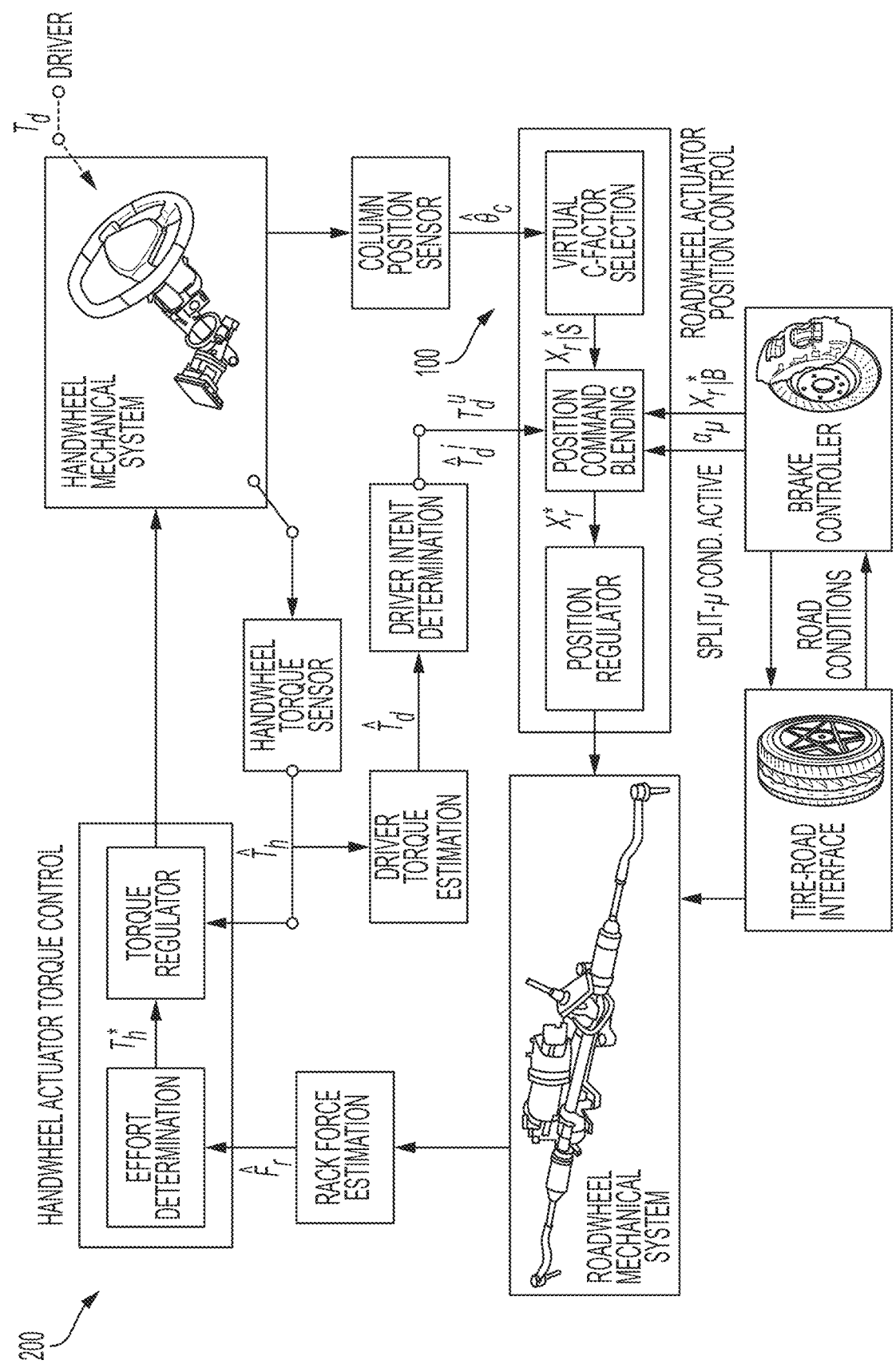
FIGS. 3 and 4 generally illustrate a coordinated chassis control system according to the principles of the present disclosure.

With reference to FIG. 3, a coordinated chassis control system 200 is generally illustrated. The system 200 may include the controller 100, a brake controller, a roadwheel system, a handwheel system, and/or any other suitable features in addition to or instead of those described herein.

Figure 4:
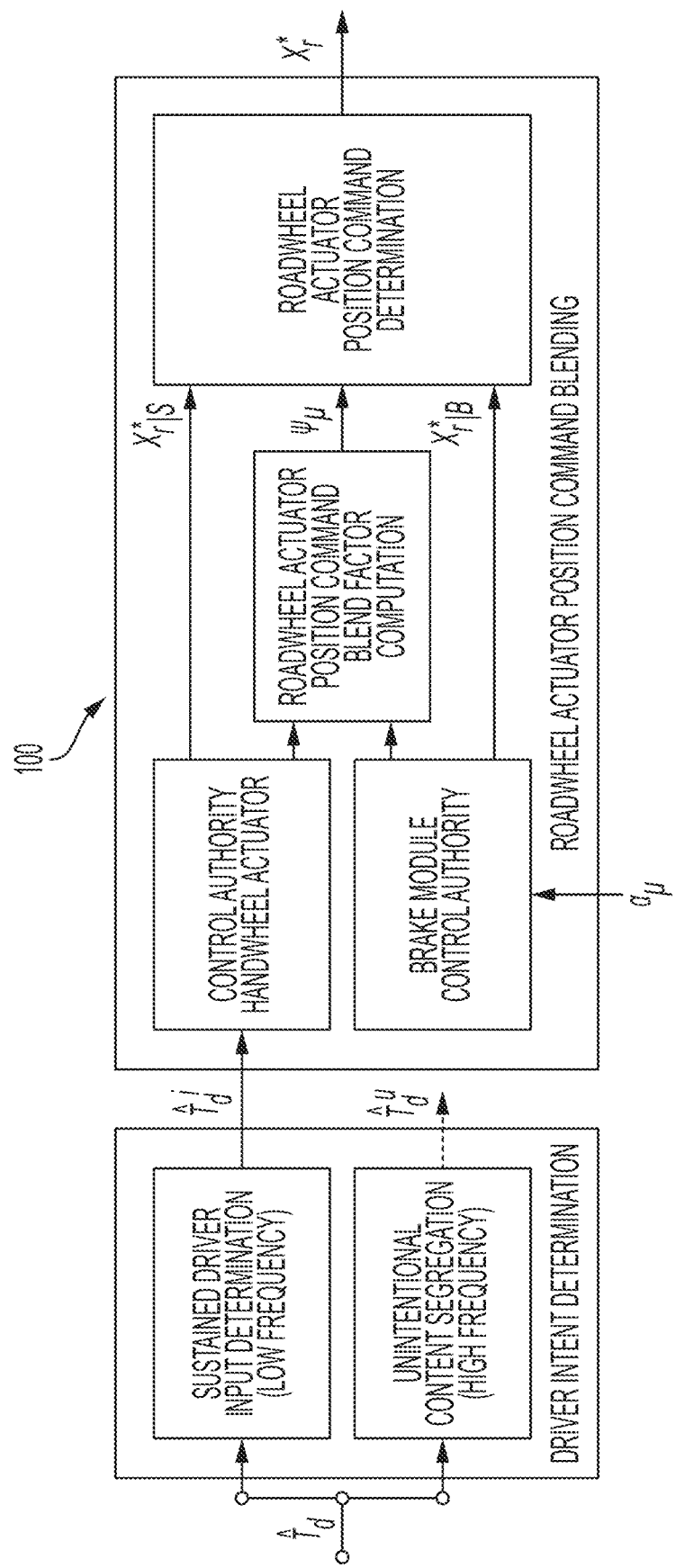

The system 200 may be configured to provide roadwheel actuator position command blending and driver intent determination, as is generally illustrated in FIG. 4. Roadwheel actuator position command blending enables active management of the control authority of the HWA or the brake system over the RWA. The rack (e.g., tire) position command received by the RWA $x_r^*$ is computed by arbitrating the position commands emanating from the HWA $x_{r|S}^*$, and the brake controller $x_{r|B}^*$, based on the status of the split mu condition status $\alpha\mu$ as determined by the brake controller independently and the driver intent represented by $\hat{T}_d^i$ (e.g., which may be derived from the driver torque estimate $\hat{T}_d$). The driver torque estimate may be obtained using model-based estimation techniques, approximated as being equal to the handwheel torque, or using any other suitable technique. The system 200 may include a disturbance observer to improve the accuracy of the driver torque estimate. The position command blending operation may be defined according to:

$$x_r^* = \psi_\mu x_{r|S}^* + (1 - \psi_\mu) x_{r|B}^*$$

$$\psi_\mu = f\left(\alpha_\mu, \hat{T}_d^i\right)$$

where $\psi_\mu$ represents a blend factor (e.g., which may determine the relative control authority of the HWA or brake controller over the RWA). When the driver is not actively steering the vehicle 10 during the split mu condition, the blend factor is determined by the brake controller split mu status $\alpha_\mu$. Under this condition, the blend factor is set such that the position command is equal to the position command determined by the brake controller $x_{rlB}^*$ from the moment of initiation of a mitigation algorithm until the event is over which, in-turn, is based on vehicle stability. Vehicle stability may be determined using a reduced variation of yaw rate to within a pre-determined threshold, which is achieved when the tendency of the vehicle to yaw is minimized. It should be understood that the vehicle stability may be monitored or determined using any suitable technique.

The controller 100 may determine the driver intent using the driver torque estimate, which may represent the input received from the driver of the vehicle 10 by the HWA. Under the split mu condition, where the overall vehicle experiences a transient instability, any high frequency content in the driver torque $\hat{T}_d^u$ input is primarily due to either the transmission of the rapidly changing rack (e.g., tire) forces to the HWA or the unintended inputs from the driver who is unable to actively control the vehicle 10, or a combination thereof. However, any sustained driver input $\hat{T}_d^i$, which may correspond to a sufficient magnitude of the low frequency content of the drive torque estimate, typically indicates the true intent of the driver trying to steer the vehicle 10 in a specific direction due to external conditions that may not be immediately determined by the brake controller and thus captured within the split mu status $\alpha\mu$. The controller 100 may obtain the driver intent determination by employing a filtering scheme that separates the driver intent from the remaining content. The analytical expression capturing driver intent determination may be defined according to:

$$\hat{T}_d^i = H_d^i \hat{T}_d$$

where $H_d^i$ is a low pass filter that attenuates any unintended high frequency content in the driver torque and transmits the sustained low frequency inputs indicating true driver intention. It should be understood that, any suitable low pass filter design may be used to segregate true driver intent from unintended content. A general analytical expression capturing this scheme may be defined according to:

$$\hat{T}_d^i + \hat{T}_d^u + \Delta \hat{T}_d = \hat{T}_d$$
$$\hat{T}_d^u = H_d^u \hat{T}_d$$

where $H_d^u$ is a high pass filter that separates out the unintended high frequency content from the driver torque estimate and $\Delta \hat{T}_d$ is a residual term representing signal content that is not otherwise captured in the filtering scheme. The filtering scheme, which minimizes tuning complexity may be defined according to:

$$H_d^i + H_d^u = 1$$

which may imply that $\Delta \hat{T}_d$ is zero, and the low and high pass filters are coupled. Respective transfer functions may be implemented according to:

$$H_d^i = \frac{\omega_c}{s + \omega_c}$$
$$H_d^u = 1 - H_d^i = \frac{s}{s + \omega_c}$$

where the cutoff frequency $\omega_c$ segregates the true driver intent and is determined by prior knowledge of a typical frequency spectrum of the driver torque signal particularly under split mu conditions.

In some embodiments, the controller 100 may receive, in response to a detected split road friction condition, a first rack position command from a brake controller (e.g., which may include the brake controller of FIG. 3) of the vehicle 10. The controller 100 may detect the split road friction condition based on one or more signals received from the brake controller and/or using any suitable information or technique.

The controller 100 may receive a second rack position command from a handwheel actuator based on a sensed measurement from a handwheel torque sensor, which may include one of the sensors 106. The controller 100 may estimate a driver torque value based on the second rack position command. For example, the controller 100 may estimate the driver torque value based on the second rack position command using a model-based approach, using a disturbance observer, using a corresponding handwheel actuator torque value, any other suitable information or technique, or a combination thereof.

The controller 100 may determine a driver intent value based on the driver torque value. For example, the controller 100 may determine the driver intent value by applying at least one high pass filter to the driver torque value, by applying at least one low pass filter to the driver torque value, using any suitable technique, and/or a combination thereof.

The controller 100 may generate a blended rack position command based on the first rack position command and the driver intent value. The blended rack position command may be 0 or substantially 0, in response to the driver intent value being 0. The controller 100 may selectively control rack position of the rack associated with the steering system of the vehicle 10 based on the blended rack position command, the first rack position command, and the second rack position command.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
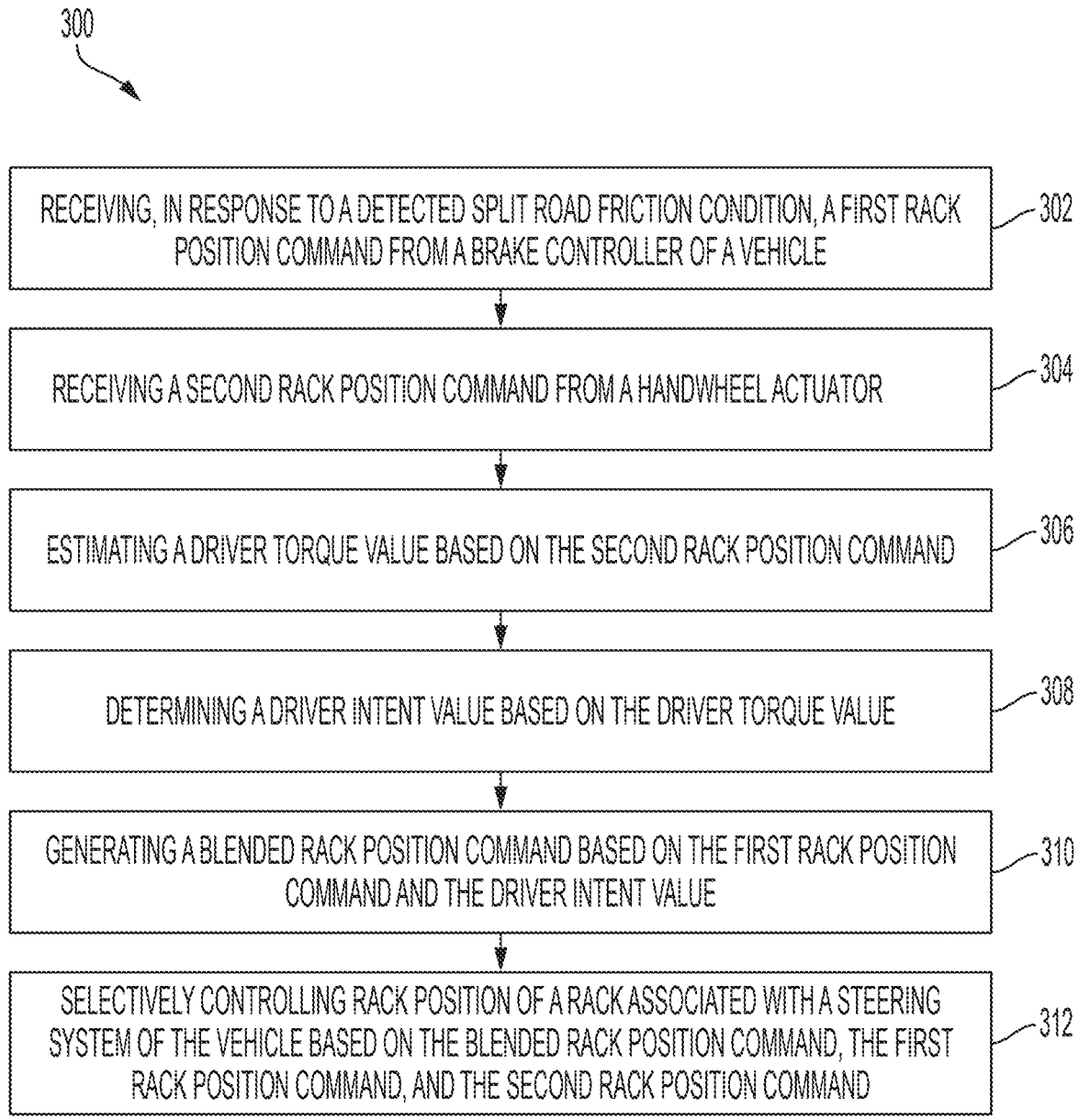
FIG. 5 is a flow diagram generally illustrating a coordinated chassis control method according to the principles of the present disclosure.

FIG. 5 generally illustrates a coordinated chassis control method 300, according to the principles of the present disclosure. At 302, the method 300 receives, in response to a detected split road friction condition, a first rack position command from a brake controller of a vehicle. For example, the controller 100 may receive, in response to the detected split road friction condition, the first rack position command from the brake controller of the vehicle 10.

At 304, the method 300 receives a second rack position command from a handwheel actuator. For example, the controller 100 may receive the second rack position command from the handwheel actuator.

At 306, the method 300 estimates a driver torque value based on the second rack position command. For example, the controller 100 may estimate the driver torque value based on the second rack position command.

At 308, the method 300 determines a driver intent value based on the driver torque value. For example, the controller 100 may determine the driver intent value based on the driver torque value.

At 310, the method 300 generates a blended rack position command based on the first rack position command and the driver intent value. For example, the controller 100 may generate the blended rack position command based on the first rack position command and the driver intent value.

At 312, the method 300 selectively controls rack position of a rack associated with a steering system of the vehicle based on the blended rack position command, the first rack position command, and the second rack position command. For example, the controller 100 may selectively control the rack position of the rack associated with the steering system of the vehicle 10 based on the blended rack position command, the first rack position command, and the second rack position command.

In some embodiments, a method for coordinated chassis control under a split road friction condition includes receiving, in response to a detected split road friction condition, a first rack position command from a brake controller of a vehicle. The method also includes receiving a second rack position command from a handwheel actuator, estimating a driver torque value based on the second rack position command, determining a driver intent value based on the driver torque value, and generating a blended rack position command based on the first rack position command and the driver intent value. The method also includes selectively controlling rack position of a rack associated with a steering system of the vehicle based on the blended rack position command, the first rack position command, and the second rack position command.

In some embodiments, the steering system includes a steer-by-wire steering system. In some embodiments, the method also includes detecting the split road friction condition based on one or more signals received from the brake controller. In some embodiments, determining the driver intent value based on the driver torque value includes applying a high pass filter to the driver torque value. In some embodiments, determining the driver intent value based on the driver torque value includes applying a low pass filter to the driver torque value. In some embodiments, the blended rack position command is 0 in response to the driver intent value being 0. In some embodiments, estimating the driver torque value based on the second rack position command includes estimating the driver torque value using a model-based approach. In some embodiments, estimating the driver torque value based on the second rack position command includes estimating the driver torque value using a disturbance observer.

In some embodiments, a system for coordinated chassis control under a split road friction condition includes a processor, and a memory. The memory includes instructions that, when executed by the processor, cause the processor to: receive, in response to a detected split road friction condition, a first rack position command from a brake controller of a vehicle; receive a second rack position command from a handwheel actuator; estimate a driver torque value based on the second rack position command; determine a driver intent value based on the driver torque value; generate a blended rack position command based on the first rack position command and the driver intent value; and selectively control rack position of a rack associated with a steering system of the vehicle based on the blended rack position command, the first rack position command, and the second rack position command.

In some embodiments, the steering system includes a steer-by-wire steering system. In some embodiments, the instructions further cause the processor to detect the split road friction condition based on one or more signals received from the brake controller. In some embodiments, the instructions further cause the processor to determine the driver intent value based on the driver torque value by applying a high pass filter to the driver torque value. In some embodiments, the instructions further cause the processor to determine the driver intent value based on the driver torque value by applying a low pass filter to the driver torque value. In some embodiments, the blended rack position command is 0 in response to the driver intent value being 0. In some embodiments, the instructions further cause the processor to estimate the driver torque value based on the second rack position command using a model-based approach. In some embodiments, the instructions further cause the processor to estimate the driver torque value based on the second rack position command using a disturbance observer.

In some embodiments, an apparatus for coordinated chassis control under a split road friction condition includes a processor, and a memory. The memory includes instructions that, when executed by the processor, cause the processor to: receive, in response to a detected split road friction condition, a first rack position command from a brake controller of a vehicle; receive a second rack position command from a handwheel actuator; determine a driver torque value based on the second rack position command; determine a driver intent value by applying at least one high pass filter to the driver torque value and applying at least one low pass filter to the driver torque value; generate a blended rack position command based on the first rack position command and the driver intent value; and selectively control rack position of a rack associated with a steering system of the vehicle based on at last one of the blended rack position command, the first rack position command, and the second rack position command.

In some embodiments, the blended rack position command is 0 in response to the driver intent value being 0. In some embodiments, the instructions further cause the processor to determine the driver torque value based on the second rack position command using a model-based approach. In some embodiments, the instructions further cause the processor to determine the driver torque value based on the second rack position command using a disturbance observer.

In some embodiments, a method for coordinated chassis control includes: receiving, in response to a detected condition, a first rack position command from a controller of a vehicle; receiving a second rack position command from a handwheel actuator; estimating a driver torque value based on the second rack position command; determining a driver intent value based on the driver torque value; generating a blended rack position command based on the first rack position command and the driver intent value; and selectively controlling rack position of a rack associated with a steering system of the vehicle based on the blended rack position command, the first rack position command, and the second rack position command.

In some embodiments, the steering system includes a steer-by-wire steering system. In some embodiments, the method also includes detecting the condition based on one or more signals received from the controller. In some embodiments, determining the driver intent value based on the driver torque value includes applying a high pass filter to the driver torque value. In some embodiments, determining the driver intent value based on the driver torque value includes applying a low pass filter to the driver torque value. In some embodiments, the blended rack position command is 0 in response to the driver intent value being 0. In some embodiments, estimating the driver torque value based on the second rack position command includes estimating the driver torque value using a model-based approach. In some embodiments, estimating the driver torque value based on the second rack position command includes estimating the driver torque value using a disturbance observer.

In some embodiments, a system for coordinated chassis control includes: a processor; and a memory including instructions that, when executed by the processor, cause the processor to: receive, in response to a detected condition, a first rack position command from a controller of a vehicle; receive a second rack position command from a handwheel actuator; estimate a driver torque value based on the second rack position command; determine a driver intent value based on the driver torque value; generate a blended rack position command based on the first rack position command and the driver intent value; and selectively control rack position of a rack associated with a steering system of the vehicle based on the blended rack position command, the first rack position command, and the second rack position command.

In some embodiments, the steering system includes a steer-by-wire steering system. In some embodiments, the instructions further cause the processor to detect the condition based on one or more signals received from the controller. In some embodiments, the instructions further cause the processor to determine the driver intent value based on the driver torque value by applying a high pass filter to the driver torque value. In some embodiments, the instructions further cause the processor to determine the driver intent value based on the driver torque value by applying a low pass filter to the driver torque value. In some embodiments, the blended rack position command is 0 in response to the driver intent value being 0. In some embodiments, the instructions further cause the processor to estimate the driver torque value based on the second rack position command using a model-based approach. In some embodiments, the instructions further cause the processor to estimate the driver torque value based on the second rack position command using a disturbance observer.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for coordinated chassis control, the method comprising:
   receiving, in response to a detected condition, a first rack position command from a controller of a vehicle;

receiving a second rack position command from a handwheel actuator;

estimating a driver torque value based on the second rack position command;

determining a driver intent value based on the driver torque value;

generating a blended rack position command based on the first rack position command and the driver intent value; and selectively controlling rack position of a rack associated with a steering system of the vehicle based on the blended rack position command, the first rack position command, and the second rack position command.

2. The method of claim 1, wherein the steering system includes a steer-by-wire steering system.

3. The method of claim 1, further comprising detecting the condition based on one or more signals received from the controller.

4. The method of claim 1, wherein determining the driver intent value based on the driver torque value includes applying a high pass filter to the driver torque value.

5. The method of claim 1, wherein determining the driver intent value based on the driver torque value includes applying a low pass filter to the driver torque value.

6. The method of claim 1, wherein the blended rack position command is 0 in response to the driver intent value being 0.

7. The method of claim 1, wherein estimating the driver torque value based on the second rack position command includes estimating the driver torque value using a model-based approach.

8. The method of claim 1, wherein estimating the driver torque value based on the second rack position command includes estimating the driver torque value using a disturbance observer.

9. A system for coordinated chassis control, the system comprising:

a processor; and a memory including instructions that, when executed by the processor, cause the processor to:

receive, in response to a detected condition, a first rack position command from a controller of a vehicle;

receive a second rack position command from a handwheel actuator;

estimate a driver torque value based on the second rack position command;

determine a driver intent value based on the driver torque value;

generate a blended rack position command based on the first rack position command and the driver intent value; and selectively control rack position of a rack associated with a steering system of the vehicle based on the blended rack position command, the first rack position command, and the second rack position command.

10. The system of claim 9, wherein the steering system includes a steer-by-wire steering system.

11. The system of claim 9, wherein the instructions further cause the processor to detect the condition based on one or more signals received from the controller.

12. The system of claim 9, wherein the instructions further cause the processor to determine the driver intent value based on the driver torque value by applying a high pass filter to the driver torque value.

13. The system of claim 9, wherein the instructions further cause the processor to determine the driver intent value based on the driver torque value by applying a low pass filter to the driver torque value.

14. The system of claim 9, wherein the blended rack position command is 0 in response to the driver intent value being 0.

15. The system of claim 9, wherein the instructions further cause the processor to estimate the driver torque value based on the second rack position command using a model-based approach.

16. The system of claim 9, wherein the instructions further cause the processor to estimate the driver torque value based on the second rack position command using a disturbance observer.

17. An apparatus for coordinated chassis control under a split road friction condition, the apparatus comprising:

a processor; and a memory including instructions that, when executed by the processor, cause the processor to:

receive, in response to a detected split road friction condition, a first rack position command from a brake controller of a vehicle;

receive a second rack position command from a handwheel actuator;

determine a driver torque value based on the second rack position command;

determine a driver intent value by applying at least one high pass filter to the driver torque value and applying at least one low pass filter to the driver torque value;

generate a blended rack position command based on the first rack position command and the driver intent value; and selectively control rack position of a rack associated with a steering system of the vehicle based on at last one of the blended rack position command, the first rack position command, and the second rack position command.

18. The apparatus of claim 17, wherein the blended rack position command is 0 in response to the driver intent value being 0.

19. The apparatus of claim 17, wherein the instructions further cause the processor to determine the driver torque value based on the second rack position command using a model-based approach.

20. The apparatus of claim 17, wherein the instructions further cause the processor to determine the driver torque value based on the second rack position command using a disturbance observer.

* * * * *